United States Patent Office 3,500,133
Patented Mar. 10, 1970

3,500,133
ELECTRICALLY CONTROLLED SWITCH AND SWITCHING ARRANGEMENT

Arne Jensen, Als, and Hans Mungard, Langeso, Denmark, assignors to Danfoss A/S., Nordborg, Denmark, a company of Denmark

Continuation of application Ser. No. 426,741, Jan. 21, 1965. This application Dec. 11, 1968, Ser. No. 785,041
Claims priority, application Germany, Jan. 21, 1964, D 43,398, D 43,401
Int. Cl. H01h *47/24, 47/32, 47/28*
U.S. Cl. 317—130 2 Claims

ABSTRACT OF THE DISCLOSURE

Electrically controlled switch and switching arrangement usable as an electrical burner safety control for connection across a power supply line. The safety control comprises a pair of voltage-responsive elements which change their resistance from a high resistance value to a low resistance value when a predetermined switching threshold voltage thereacross is exceeded. The sum of the switching threshold voltage of both elements is more than the potential of the power supply. A voltage divider is connected across the elements having a variable resistor therein as a radiation sensitive element which varies in resistance in the presence of a flame. The voltage-responsive elements are switched "on" when a starting potential is derived from the voltage source by the voltage divider.

CROSS REFERENCE TO RELATED APPLICATION

This application is a continuation of application Ser. No. 426,741, filed Jan. 21, 1965, now abandoned.

This invention relates to an electrically controlled switch and a switching arrangement, and more particularly to a switch and switching arrangement utilizing solid state voltage controlled elements.

Solid state switching elements are well known. The silicon controlled rectifier, for example, is such an element. A variation of this device, known as the silicon controlled switch, is applicable for use with both direct and alternating currents. These devices have a separate trigger electrode, normally connected to a trigger source, to change the resistance condition of the solid state element from that of a high resistance or cut off, condition presenting practically an open circuit, to that of a low resistance conducting, or switched-ON, condition.

In the past, switches like the silicon controlled rectifier, or the silicon controlled switch were used in circuits in which the breakdown potential of the solid state element was not exceeded because otherwise, the switching action became uncontrollable.

It is an object of the present invention to provide a switch and switching arrangement utilizing two-terminal solid state elements, that is solid state elements which do not necessarily require a separate trigger electrode, and to reliably control the switching action thereof.

It is a further object of the present invention to provide a simple and effective, reliable switch which can be controlled by outside environmental conditions, such as change in incident radiation, i.e., light; change in temperature, or the like.

In accordance with the present invention, a pair of solid state switching elements which change their resistance from that of a high resistance value to one of low resistance value, when a predetermined switching threshold voltage is exceeded, are connected in series. The switching threshold voltage of each element is greater than half of the line voltage. Thus, since the line voltage is less than the sum of the switching threshold voltages of the two elements, in series, they will both remain in their high value of resistance, switched OFF condition. A trigger potential, which is greater than the switching threshold voltage of one of the elements, but which may be less than the line voltage, is then applied across one of the elements only. Upon application of this switching potential, the element across which it is applied, will change to its low resistance condition. Almost full line voltage will thus be applied to the other element which will also switch and change its condition to low resistance, thus completing a low resistance circuit through both elements, and switching the circuit ON.

If the line voltage requires, more than two elements can be placed in series, and the switching threshold voltages arranged suitably with respect to the total line voltage and the capabilities of the trigger pulse source.

The power supplied by the starting potential pulse will find a ready, low resistance path through the switched elements across which it is connected, and will not dissipate itself through other paths, such as through parallel paths in the network, because with respect to such paths, the other solid state element is in its high resistance condition.

The control potential necessary to switch any one of the elements may be less than the entire line potential. According to a feature of the invention, the starting potential is derived directly from the line voltage, for example by means of a voltage divider. This voltage divider is so arranged that under normal conditions, the resistances thereof are substantially equal; in other words, it is balanced. The resistance of one of the branches of the voltage divider is then changed in order to provide a starting potential. One branch of this voltage divider may be formed by a variable resistance, or by a resistance which has a resistance value sensitive to incident radiation, such as light, heat, pressure, or any other condition to be sensed.

Thus, photo-sensitive resistances, temperature sensitive resistances, pressure sensitive resistances, manually controllable resistors or switches, or the like, may be utilized.

If all of the solid state switching elements, in series, have a fixed predetermined threshold potential, then the applied voltage of the network must be less than the sum of the switching threshold potentials of the elements; expressed otherwise, the line voltage can be greater than the sum of the switching threshold potentials of the solid state elements, except one. The starting or switching pulse is then applied to any one element. As soon as this one switched element changes its resistance condition, a sufficient potential will be on the remainder of the serially connected elements to also switch them over to their low resistance condition.

If the line voltage is insufficient to switch the remainder of the series connected solid state elements, then control can be achieved either simultaneously, or sequentially, by selective application of switching potential to one or more additional elements. For example, two or more of the solid state elements may have their own switching impulse sources. Upon appropriate arrangement of the line voltage, the entire serially connected chain of elements will then switch if, and only if, all of the elements have their own respective starting potentials applied. Application of such a starting potential can be done, for example by a lowering of the potential drop across a portion of the serial network. It is to be noted that only a portion of the entire switching chain is first switched, and due to the change of resistance of this portion, the remainder of the solid state elements then change their resistance likewise to the low resistance state.

When switching direct current, the solid state devices may consist of the known four layer diode; for switching alternating current, or direct current, as desired, five layer diodes can be utilized.

A particularly interesting device for use in connection with solid state switches according to the invention is made from tellurium, with additives taken from Groups IV and V of the periodic table of elements. The base substance is polycrystalline. These switches are absolutely symmetrical, have high current carrying capacity, and are easily manufactured. Their switching threshold potential can readily be changed by choice of the relative ratio of components, or by appropriate choice of the thickness of the body. As an example, a solid state switch will consist of approximately 67.5% tellurium, 25% arsenic, and 7.5% germanium, made by evaporation on a metal plate, by sintering, or by solidification of an alloy melt.

According to a further feature of the invention, a pair of such solid state elements can be arranged as a single unit having a common electrode. Since the elements switch over sequentially, such a combined assembly is entirely possible, greatly simplifying the connection of the common terminal over that of a pair of physically separate elements.

The structure, organization, and operation of the invention will now be described more specifically in the following detailed description with reference to the accompanying drawings, in which.

Figure 1:
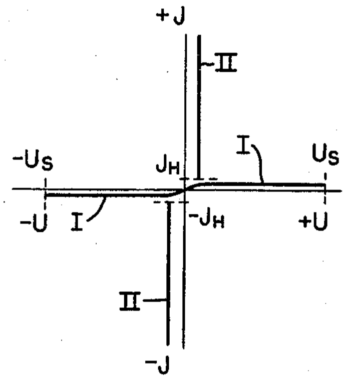
FIG. 1 is a typical voltage (abscissa) vs. current (ordinate) diagram for an element for use in the switch according to the present invention.

FIG. 1 shows, diagrammatically, a current J through a symmetrical solid state switching element, having a voltage U applied. Below the threshold potential $\pm U_S$, the current is practically zero since the switch is in its high resistance state, in which its resistance is up to several megohms (curve I). As soon as the switching threshold potential $U_S$ is exceeded, the switching element changes to its low resistance state (curve II), in which its resistance may be one ohm or less. The current through the switch is then determined only by the remainder of the circuit. The switch remains in the low resistance connection until the current decreases below the holding value $J_H$, which is almost at the zero point. As soon as $J_H$ is passed, the switch changes back to its high resistance connection.

Five layer diodes or, any multi-layer diodes with an odd number of layers show this characteristic. The best results, however, have not been obtained with multi-layer diodes, but with the polycrystalline solid state switching element consisting essentially of tellurium with the additives previously mentioned. When operation with direct current is desired, it is sufficient if the element shows the characteristics in the first quadrant; in such instance, four layer diodes, and multi-layer diodes having an even number of layers are also suitable.

Figure 2:
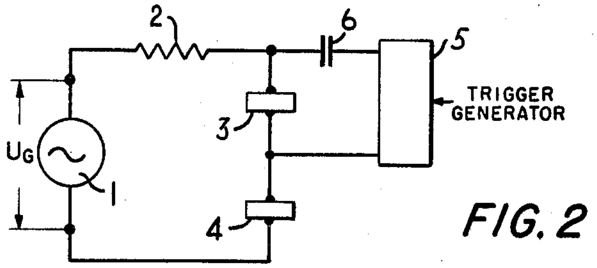
FIG. 2 is a switch according to the present invention with a separate starting potential source, for use with an alternating current supply.

Referring now to FIG. 2, an AC generator having a terminal potential $U_G$ is shown at 1; a load resistance 2 is connected in series with the electrically controlled switch, which is formed of two symmetrical solid state elements 3 and 4. Each of the solid state elements 3 and 4 then have a potential $U_G/2$ applied. This potential is less than the threshold potential $U_S$ (see FIG. 1). Thus, the circuit from generator 1 through load 2 is practically interrupted. Solid state element 3 has a trigger generator 5 connected thereto which applies a potential greater than the threshold potential $U_S$ to switch 3 over a condenser 6. As soon as such a pulse of higher potential than $U_S$ is applied, element 3 will switch to its low resistance state. Thus, the full potential of generator 1, potential $U_G$, is then applied to the solid state device 4. Since $U_G$ is greater than $U_S$, solid state switch 4 likewise changes to its low resistance state. Power is supplied to load resistance 2. Condenser 6 isolates the trigger circuit 5 from the load circuits 1, 2, 3 and 4. The potential applied to element 3 from trigger generator 5 can have various forms, for example pulses, square waves, sine waves, and if condenser 6 is replaced by a switch, also direct current. The trigger generator itself can be made in any suitable form. It can be remotely controlled, or the control potential can be derived from the trigger generator itself or derived from an impedance, an inductance, a charge capacitor, or the like.

Figure 3:
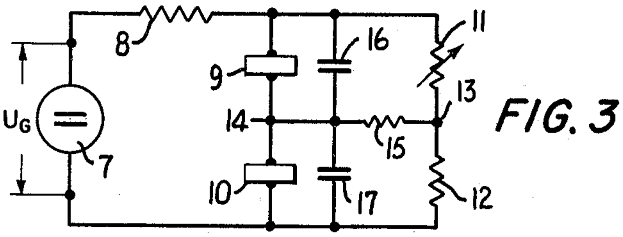
FIG. 3 is a switch according to the present invention in which the starting potential is derived from the line voltage, and for use with direct current.

FIG. 3 shows a network with a DC generator 7. Again, a load resistance 8 and two solid state elements 9 and 10 are connected in series. To control the network, a voltage divider is arranged parallel to the two elements 9 and 10, and consists of a variable resistance 11 and a fixed resistance 12. The connection point between the resistances, or the tap off point of the voltage divider 13, is connected to the central connection between the two solid state devices 9 and 10 over a current limiting resistance 15. Two bridging condensers 16 and 17 protect against over-voltage surges. It will be assumed that the generator potential $U_G$ is insufficient to switch both of the elements 9 and 10. When at rest, the resistance of the two elements 11 and 12 is approximately equal. When the variable resistance 11 is changed so that the resistance substantially decreases, the potential at the connecting point 13 changes such that resistance 12 will have a higher voltage drop. This higher voltage drop is applied to the solid state element 10 over resistance 15. As soon as this higher voltage drop exceeds the threshold potential $U_S$, element 10 switches to its low resistance state. At that point practically the entire generator potential $U_G$ is applied to the solid state element 9, so that this element likewise switches over.

Exactly the same result is achieved when the variable resistance 11 is changed so that its resistance substantially increases with respect to that of resistance 12. In this case the voltage drop over resistance 11 soon increases to such a point that then the solid state element 9 will switch, which again applies practically full line potential $U_G$ to element 10 causing it likewise to switch over.

It is not important in which direction, or how, resistor 11 changes its resistance. It can be a positive temperature coefficient resistor, a negative temperature coefficient resistor, a photo-resistor, a resistor changing its value upon application of pressure, a control resistor, or it may be a simple switch. The term "variable resistor" as used herein is intended to encompass all these variations, including that of a switch which, of course, implies an abrupt change of resistance from a high to a value of approximately zero ohms. In any event, as soon as there is a substantial change in the value of resistance of resistor 11 with respect to resistor 12, elements 9 and 10 will rapidly switch and conduct load current.

Figure 4:
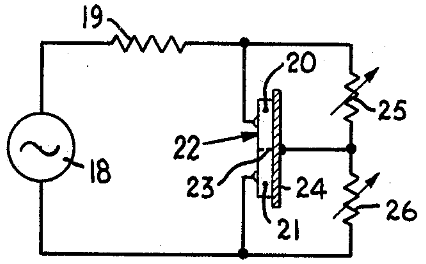
FIG. 4 is a diagram similar to that of FIG. 3, but for use with an alternating current supply, and utilizing two elements having a common electrode, and formed as one assembly.

FIG. 4 illustrates an AC generator 18 supplying load resistance 19. The two solid state switches 20 and 21 are combined into a single element 22. An imaginary division line 23 is shown dashed in the figure. The common electrode 24 is formed by a metal plate on which the element 22 is mounted. In parallel thereto a series connection of a pair of variable resistances 25, 26, is connected, acting as a voltage divider, and influencing the two elements 20, 21 in a manner similar to that of voltage divider 11, 12 with respect to the elements 9 and 10 of FIG. 3 above. As shown, both resistances 25, 26, may be variable. One may be arranged as a calibrating resistor, and the other as a transducer for light, heat, pressure, or the like; or both may be arranged in connection with transducers, causing switching in case an unbalance of either resistance, with respect to the other, results. The switching speed can be increased, if both resistances are influenced in opposite directions, for example by use of a positive temperature coefficient resistance for one, and a negative temperature coefficient resistance for the other.

Figure 5:
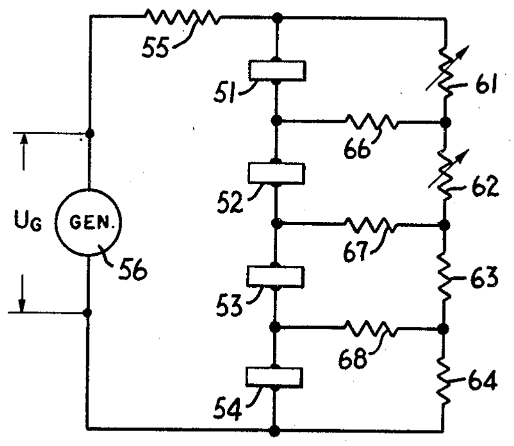
FIG. 5 is a diagram illustrating a plurality of elements in series.

FIG. 5 illustrates a plurality of elements 51, 52, 53, 54, connected in series, and arranged to switch a load 55 connected across generator 56. A voltage divider consisting of resistors 61, 62, 63 and 64, is connected in parallel to the chain of switching elements 51–54. The connection points of resistances 61 to 64 are interconnected with the connection points of elements 51–54 by means of current limiting resistors 66, 67, 68.

Assume that the generator 56 supply voltage $U_G$ is greater than the threshold voltages $U_S$ of elements 52, 53, and 54, but less than the sum of the threshold voltages of elements 52, 53, 54 and 51. The switch will not conduct. Upon change of any one of the resistances 61 to 64, to a low value, the threshold voltages of the remaining three solid state elements will be exceeded, and they will start to conduct; at this point almost full line voltage is applied to the remaining element, which will likewise conduct and the switch will close, effectively carrying power through load resistance 55.

Assume now that the line voltage $U_G$ of generator 56 is adjusted such that it is greater than the sum of the threshold voltages of two of the elements, for example 53 and 54, but less than the sum of the threshold voltages of any one additional element 52 or 51 added to the sum of the threshold voltages of 53 and 54. It is now necessary that both solid state elements 51 and 52 be rendered conductive before potential exceeding the threshold voltage causing conduction of elements 53 and 54 can be applied to these latter elements. This can be done by simultaneous substantial lowering of resistances 61, 62, causing application of potential in excess of the threshold to elements 53 and 54; as soon as resistances 61, 62 go back to normal, elements 51 and 52, now having full line voltage applied, will then also conduct. It is of course also possible to substantially increase the resistance of both resistors 61, 62, thus causing first conduction of elements 51, 52 (since their threshold has been exceeded) which, in effect places line voltage across the remaining elements 53 and 54 and causes their conduction, as previously explained. It is to be noted that in this connection, resistors 61, 62, have to both be changed in the same direction, that is both have to either increase, or both have to decrease their value. Change of one in one direction such as increase and change of the other resistance in the other direction such as decrease will have a balancing effect, and assuming the line voltage $U_G$ is insufficient to switch three elements, will not cause power to flow through load resistance 55.

It is to be noted that the resistances 61 to 64, or 11, 12, FIG. 3; 25, 26, FIG. 4, need not be equal. They have to be matched to the switching threshold potentials $U_S$ of the solid state element, with which they are intended to be used, however.

Power supplies 1, 7 and 18 (FIGS. 2 to 4) may be generators or any source of potential. The load may be a pure resistance, or include reactance, capacitive or inductive. The voltage divider may include delay elements or phase shift devices. By use of phase shift devices in connection with a variable resistance of the voltage divider, selected desired portions of an AC wave may be permitted to be applied to the load the device cutting off when the AC wave goes through null. The power supply necessary to switch the solid state element can be derived not only by direct application to potential, but also by applying a pulse over a condenser or, for example a condenser discharge directly.

Figure 6:
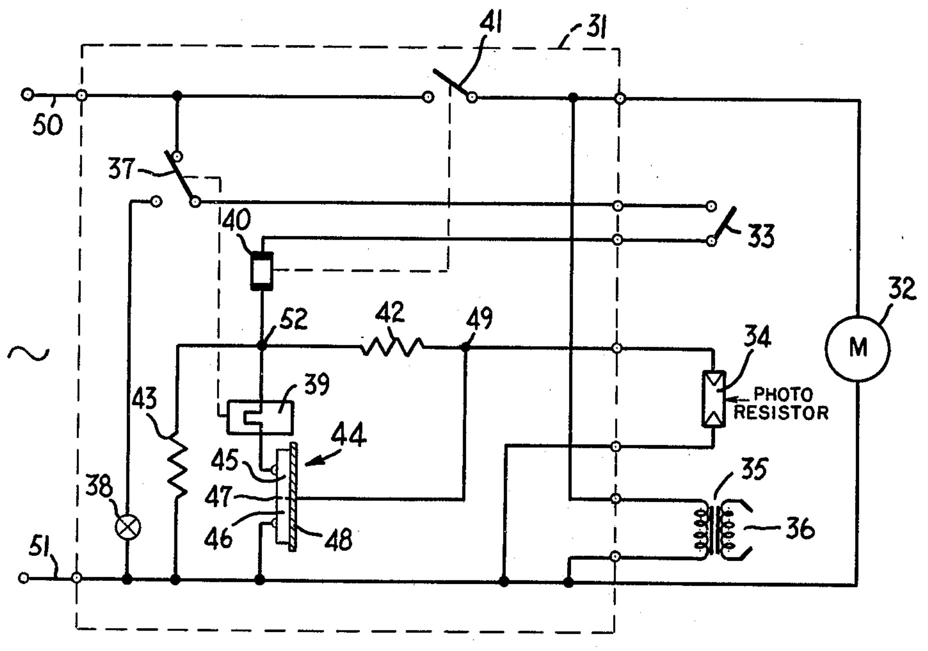
FIG. 6 is a diagram of the switch utilizing a photosensitive resistance in a burner control.

Referring now to FIG. 6, a control circuit for use with an oil burner is illustrated. Control unit 31 is connected to a single phase alternating current supply connected to lines 50, 51, of which 51 may be grounded. An oil burner motor 32, control thermostat 33, shown schematically as a switch, safety photo-resistor 34, and ignition transformer 35 with ignition electrode 36, are indicated schematically since all these components are well known in the field. The control equipment itself has a safety switch 37 which, when it is connected from its normal position as shown, to the alarm position, causes an alarm signal lamp 8 to light. A motor relay is provided comprising relay coil 40 and its associated main switch element 41. The circuit may be traced from line 50 through switch 37 and switch 33 and then motor relay coil 40 to a junction 52. Junction 52 is connected by means of a resistor 43 to ground. In parallel with the resistance is a heat sensitive relay 39, and solid state switch unit 44, formed of two serially connected switch elements 45 and 46, applied to a common electrode 48. The elements 45, 46 are deemed as two single, separate solid state switch elements as indicated by the dashed line 47. Also connected to terminal 52 is a resistor 42, and a photo-resistor 34, which has a resistance similar to that of resistance 42 when illuminated, but a substantially higher resistance than resistance 42 when dark. Junction 49 between resistances 34 and 42 is connected to the common electrode 48 of solid state element 44.

The operation of this circuit is as follows: When thermostatically controlled switch 33 closes, line potential is applied over closed switch 37, relay coil 40, to junction 52. The resistance of resistor 43 is adjusted such that the current flowing therethrough is insufficient to pull in relay coil 40. The current through solid state element 44 is extremely low, because element 44 is still in its high resistance condition and thus, practically, presents an open circuit. Additionally, current will flow through resistance 42, and photo-sensitive resistance 44. As stated before, the resistance of photo-sensitive resistor 34, when dark, is substantially higher than that of resistor 42. Thus, the major portion of the voltage drop from the line supply 51, 50, will occur over photo-sensitive resistor 34, and will be applied over portion 46 of solid state element 14, by the connection from junction 49 to common electrode 48. The path 46 of solid state element 44 will thus have a potential applied which is greater than its switching threshold potential, and switch to its low resistance state. As soon as this happens, substantially the entire line voltage will be applied across resistor 42, that is between junctions 52 and 49, and across the portion 45 of solid state element 44, thus causing switching of the entire element to its low resistance condition. The current through the relay coil 40 will now be sufficient to cause the relay to pull in, and contact 41 will close, starting motor 32 an applying potential to the ignition transformer 35 and ignition electrode 36. If the burner starts, and the flame lights, the resistance of photo-sensitive resistor 34 will drop and become substantially equal to the resistance of resistor 42. At the next half wave the element 44 will then switch over into its high resistance state. Resistor 43, however, will be able to carry sufficient current to hold relay 40, 41 in its pulled-in, that is closed position although the current through resistor 43 by and itself would be insufficient to pull in the relay when it was open. In case the flame should not light, current through relay coil 40 and the very low resistance of element 44 will cause temperature sensitive resistor 39 to heat, causing switch over of switch 37 from the position shown to connect line 50 over the switch to alarm light 38, and at the same time opening the circuit from line 50 through the starting coil 40, thus causing opening of contact 41, stopping motor 32 supplying fuel to the burner. Preferably, the switch 37 is arranged in such a manner that it will lock in position keeping lamp 38 lit until manually reset to the position shown in solid line in FIG. 6.

Short circuit at the photo-sensitive resistor 34 does not cause a dangerous condition. In such case, full potential is applied across resistor 42, and then first the region 45 of element 44 will switch to the low resistance condition, thereafter region 46 will switch to the low resistance condition. Excessive current will flow over heating element 39 which will again cause operation of safety switch 37 and an alarm. A similar operation will result in case photo-sensitive resistor 34 should burn out. In such case, region 46 of solid state element 44 will switch first, then region 45, and the element 44 will remain in its low resistance connection, again causing operation of the heating coil 39 and safety switch 37.

The circuit is very economical in its use with components and parts; apparatus of the prior art containing inherent fail-safe operation of its flame sensitive device required a larger number of parts.

In a similar manner, other switches utilized in the control apparatus may be replaced by solid state devices. For example, resistor 42, or resistor 34, or a resistance in series with one or the other, may be built as a temperature sensitive resistance, heated by current within the control device. Additional solid state switches may be included in the main circuit to the motor and the ignition system, and the control resistances therefore arranged in such a way and dimensioned such that only upon proper, normal operation, the element will remain in its low resistance state.

Applicants have thus provided an electrically controlled switch, or switching arrangement, for use in control circuits, in which a pair of serially controlled two-terminal voltage sensitive switching elements are used. Such two-terminal elements may be multi-layer diodes. If these multi-layer diodes have separate gate terminals, their use, and the application of separate trigger voltages therefore, is not necessary, and they may thus be termed for purposes of the present invention also "two-terminal" voltage sensitive switching elements. The design of the circuit is such that the sum of the switching threshold voltages of the elements is more than the potential of the voltage source. Means are provided to connect a starting potential across one of the elements, causing it to switch to its low voltage condition; essentially the entire line voltage will then be applied across the other element which will likewise switch in its low voltage condition. The starting potential may be derived from the line voltage itself, for example by means of a voltage divider. This voltage divider may include a variable resistor which may be sensitive to ambient conditions. The change in resistance, in response to ambient conditions may be in either direction; that is it may be increasing or decreasing and in the final limit, or an entire short circuit, such as by means of a switch. When connected into a burner control system, the solid state element is preferably placed in series with a time-current sensitive device and connected in such a manner that it will provide only starting current for control of the burner circuit; as soon as the burner circuit is started, the element will switch back to its high resistance condition. In case of malfunction, the time-current sensitive device will then have current applied over an excessive period of time, causing operation of a safety alarm.

What we claim and desire to be secured by Letters Patent is:

1. Electrical burner safety control for connection across a power supply line, comprising a pair of voltage sensitive elements which change their resistance from a high resistance value to a low resistance value when a predetermined switching threshold voltage, connected thereacross, is exceeded, said elements being connected in series; a voltage divider including a radiation sensitive element exposed to the burner flame, said radiation sensitive element exhibiting a first resistance value when the flame is extinguished and a second resistance value when the flame is burning, and a fixed resistance; said voltage divider being connected across said elements and the junction betwen said fixed resistance and said radiation sensitive element being connected to the midpoint of said voltage sensitive elements; the fixed resistance having a value substantially equal to one of the values of resistance of the radiation sensitive element; a starting switch; an operating relay requiring a first, operating value of current, and a second, lower holding value of current; said starting switch, and said operating relay being connected in series across the power supply line; and means independent of said series circuit supply holding current only.

2. A control as claimed in claim 1 including a time delay safety relay, responsive to a predetermined current for a predetermined time, said safety relay being serially connected in the series circuit formed by the operating relay and said pair of voltage sensitive elements.

References Cited

UNITED STATES PATENTS

| | | | |
|---|---|---|---|
| 2,554,800 | 5/1951 | Steiner | 315—189 X |
| 3,089,065 | 5/1963 | Worden | 317—130 |
| 3,134,053 | 5/1964 | Wittig et al. | 317—130 |
| 3,211,971 | 10/1965 | Barson et al. | |
| 3,226,625 | 12/1965 | Ditbold. | |
| 3,270,799 | 9/1966 | Pinckaers | 317—130 |
| 3,274,397 | 9/1966 | Heckman et al. | |

LEE T. HIX, Primary Examiner

U.S. Cl. X.R.

307—235, 318, 324; 317—148.5, 149, 154; 328—6